United States Patent [19]

Langhoff

[11] Patent Number: 5,306,025
[45] Date of Patent: Apr. 26, 1994

[54] CLAMPING DEVICE FOR A COMPASS SAWING MACHINE

[75] Inventor: Boris Langhoff, Backnang, Fed. Rep. of Germany

[73] Assignee: Altas Copco Elektrowerkzeuge GmbH, Winnenden, Fed. Rep. of Germany

[21] Appl. No.: 38,716

[22] Filed: Mar. 26, 1993

[51] Int. Cl.⁵ .................. B25B 5/00; B27B 19/09
[52] U.S. Cl. ........................ 279/90; 30/392; 83/698.11
[58] Field of Search .............. 279/89, 90, 91; 30/337-339, 392-394; 83/697, 698

[56] References Cited

U.S. PATENT DOCUMENTS

| 3,823,473 | 7/1974 | Hoffman | 30/338 |
| 4,285,129 | 8/1981 | Hoffman | 30/392 |
| 4,299,402 | 9/1981 | Hoffman | 279/75 |
| 4,324,512 | 9/1982 | Siroky | 408/240 |

FOREIGN PATENT DOCUMENTS

| 3006299A1 | 8/1981 | Fed. Rep. of Germany . |
| 3245359A1 | 6/1984 | Fed. Rep. of Germany . |
| 4102011A1 | 12/1991 | Fed. Rep. of Germany . |
| 2154109 | 4/1973 | France . |
| 501868 | 3/1976 | U.S.S.R. . |
| 907520 | 10/1962 | United Kingdom . |

Primary Examiner—Steven C. Bishop
Attorney, Agent, or Firm—McGlew and Tuttle

[57] ABSTRACT

A clamping device (3) for the saw blade (4) of a hand-operated compass sawing machine has a centering sleeve (7) for the clamped end (5) of the saw blade (4) and a clamping sleeve (10) rotatably mounted on the centering sleeve (7). During the rotation of the clamping sleeve (10) by means of a torsion spring (11), the clamping sleeve (10) is brought, via inclined planes, into the clamping position for the saw blade (4). To improve handling, and especially to make the adjusting member (27, 20) independent of the sawing stroke, a connection bush (27) with a gripping member (28), which connection bush is mounted axially nondisplaceably in the housing (1), is provided as an adjusting member.

14 Claims, 6 Drawing Sheets

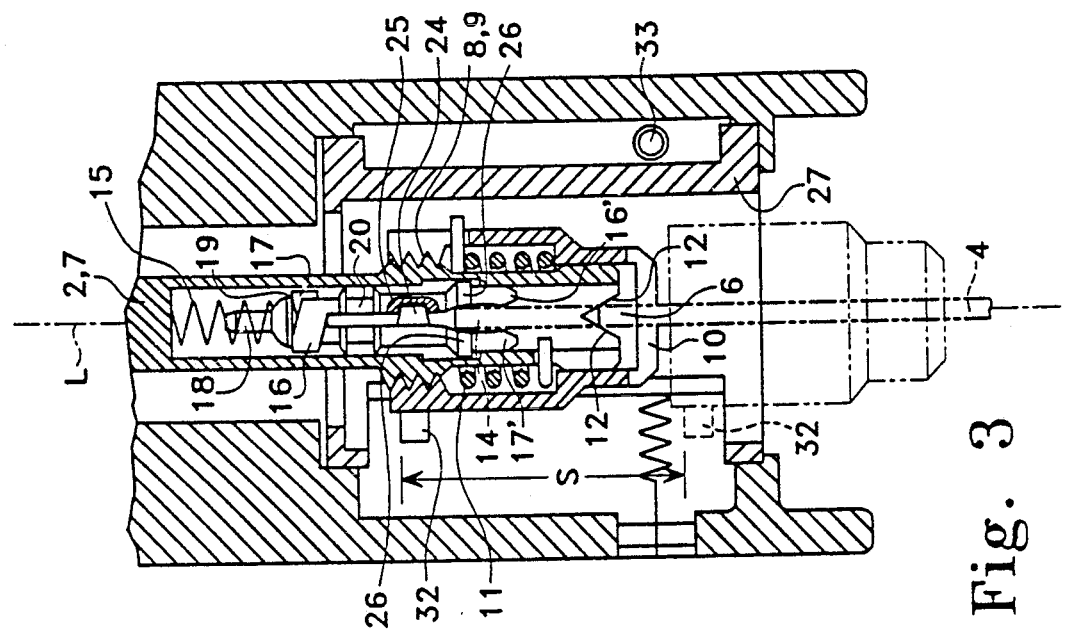
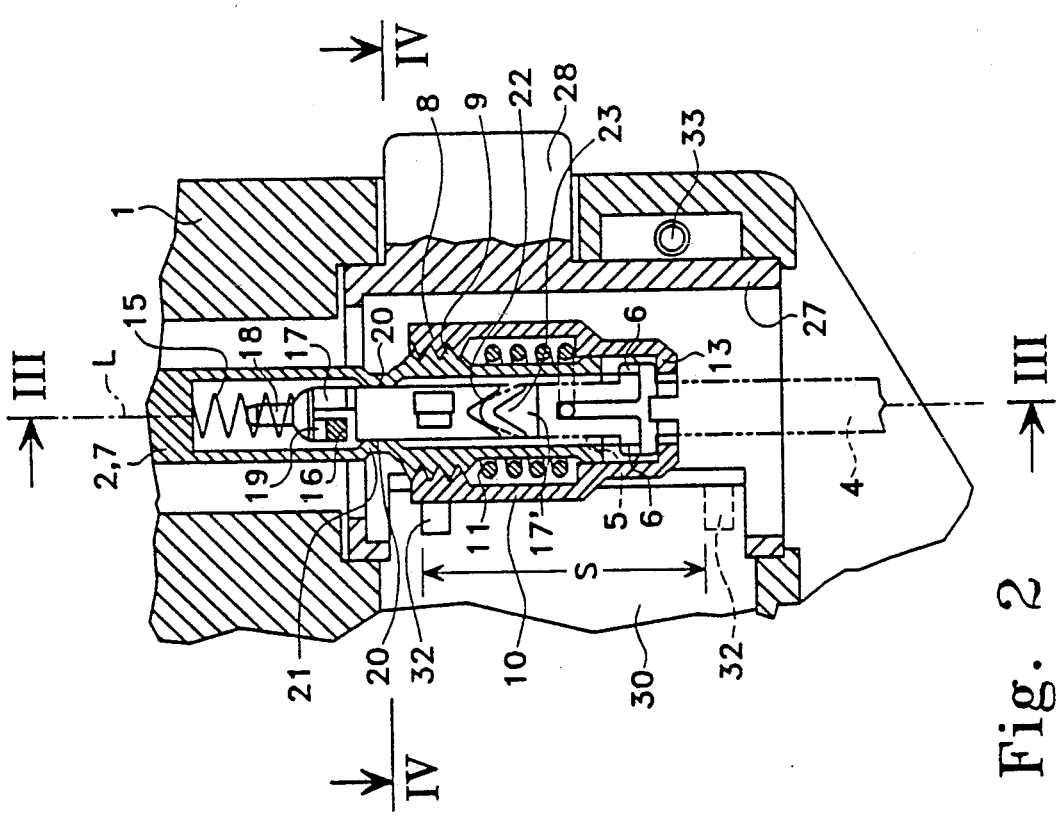
Fig. 3
Fig. 2

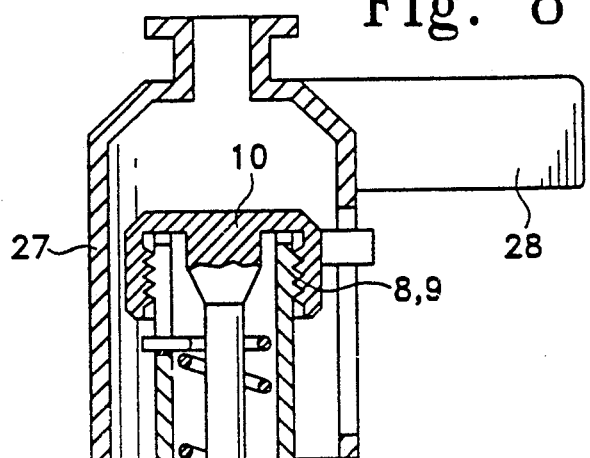
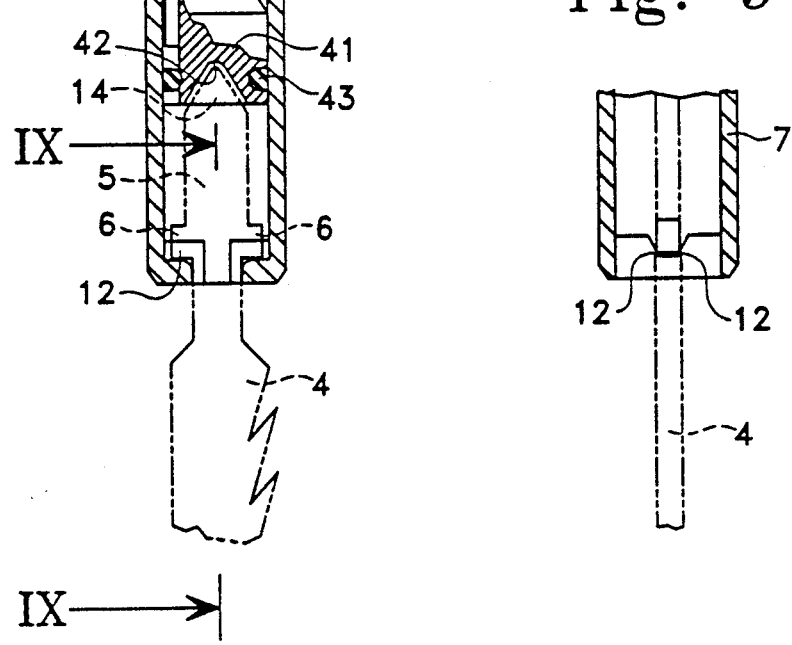

CLAMPING DEVICE FOR A COMPASS SAWING MACHINE

FIELD OF THE INVENTION

The present invention pertains to a clamping device for the saw blade of a hand-operated compass sawing machine, which saw blade can be moved in parallel to its longitudinal axis by a plunger driven according to the sawing stroke in the housing of the compass sawing machine, and which has two dogs at its clamped end, comprising a centering sleeve, into which the clamped end can be inserted, and an adjusting member for releasing the saw blade.

BACKGROUND OF THE INVENTION

Such a clamping device is described in DE 32,45,359 A1. The manner of clamping for the saw blade is unsatisfactory there, and it may lead to inaccurate cutting, especially in the case of different saw blade thicknesses. Even though a leaf spring is provided for pressing the saw blade, it cannot guarantee rigid, central guiding of the saw blades in the case of higher loads and different saw blade thicknesses. A slide is mounted in a slot of the housing as an adjusting member for releasing the saw blade. To release the saw blade, it is necessary to find the position in which the slide is able to release the saw blade from the centering sleeve. In addition, the point of clamping of the saw blade cannot be reached automatically. Actuating the slide is again necessary for this.

Clamping devices for saw blades of compass saws are described in U.S. Pat. No. 3,823,473. However, these are intended for saw blades different from those mentioned here, namely, for saw blades which are guided at holes. Positive-locking, accurate fit is not guaranteed there either in the case of saw blades of different thickness.

DE 30,06,299 A1 discloses a clamping device for a compass saw, in which the end of the saw blade can be tensioned or released by means of an adjusting member accessible from the outside at the plunger. Even though this makes it possible to replace the saw blade rapidly and without auxiliary tools, a displacement, which has an unfavorable effect on the precision of the sawcut, may develop between the longitudinal axis of the plunger and the longitudinal axis of the saw blade in the case of different saw blade thicknesses.

A clamping device for a compass saw is disclosed in DE 41,02,011 A1, which was not previously published. The precision of the sawcut is improved by a centering sleeve there, in which the clamped end of the compass sawing machine can be clamped by means of a clamping sleeve. The adjusting member is axially rigidly connected to the clamping sleeve, and is rotatable relative thereto. The adjusting member follows the sawcut and, if desired, in the case of an oscillating compass saw, also the oscillating movement. This is undesirable for the handling of the compass saw, and involves a certain risk of injury.

A one-part, spring-loaded centering pin, which supports the end zone of the clamped end of the saw blade, is mounted in the centering sleeve according to DE 41,02,011 A1. There inherently is a clearance between the centering pin and the centering sleeve. This leads to undesirable lateral movements of the saw blade. Such lateral movements diminish the precision of the sawcut.

SUMMARY AND OBJECTS OF THE INVENTION

The task of the present invention is to suggest a clamping device of the type described in the introduction, which improves the handling of the compass saw, wherein especially the adjusting member does not follow the movement of the saw blade despite accurate clamping of the saw blade.

The above object is attained according to the present invention in a clamping device of the type described in the introduction by providing a clamping sleeve, which is mounted rotatably around the longitudinal axis, and performs an axial movement causing clamping of the dogs of the clamped end in the centering sleeve by means of an inclined plane and a spring; by the clamping sleeve being able to be rotated into the releasing position from the clamping position against the force of the spring by means of the adjusting member; by the adjusting member being formed by an axially nondisplaceably mounted connecting bush, which is pivotable approximately around the longitudinal axis in the housing; by the connecting bush projecting with a gripping member over an opening of the housing; and by the connecting bush forming a stop edge, which is at least as long as the sawcut in the axial direction, wherein the stop edge is located opposite an actuating cam of the clamping sleeve and rotates the clamping sleeve from its clamping position into the releasing position on actuation of the gripping member.

The adjusting member, i.e., both the connecting bush and its gripping member, is thus prevented from following the movement of the saw blade. The connection bush is free relative to the clamping sleeve during the sawing operation, and is stationary. This diminishes the risk of injury, and improves the handling of the compass saw, and even the ease of operation of the adjusting member during the insertion or replacement of a saw blade.

The present invention has the further advantage that the saw blades are guided centrally in a positive-locking manner even in the case of different thicknesses. This considerably improves the precision of cut of the compass sawing machine.

The present invention is further improved in the case of an oscillating compass sawing machine in that the connection bush has an inner wall area that is closer to the clamping sleeve than the wall as a whole, and this inner wall area presses the oscillating clamping sleeve to an end point of the oscillating stop on actuation of the connection bush. It is thus achieved that the centering sleeve and the clamping sleeve are brought into a defined position of the oscillating stroke for inserting a saw blade, in which position the saw blade can easily be inserted.

Further advantageous embodiments of the present invention will become apparent from the subclaims and the following description of exemplary embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a longitudinal sectional view of the clamping device, enlarged compared with FIG. 1;

FIG. 3 is a longitudinal sectional view taken along line III—III according to FIG. 2;

FIG. 8 is a longitudinal sectional view of another exemplary embodiment;

FIG. 9 is a partial sectional view taken along line IX—IX according to FIG. 8;

DETAILED DESCRIPTION OF THE PREFERRED EMBODIMENT

Figure 1:
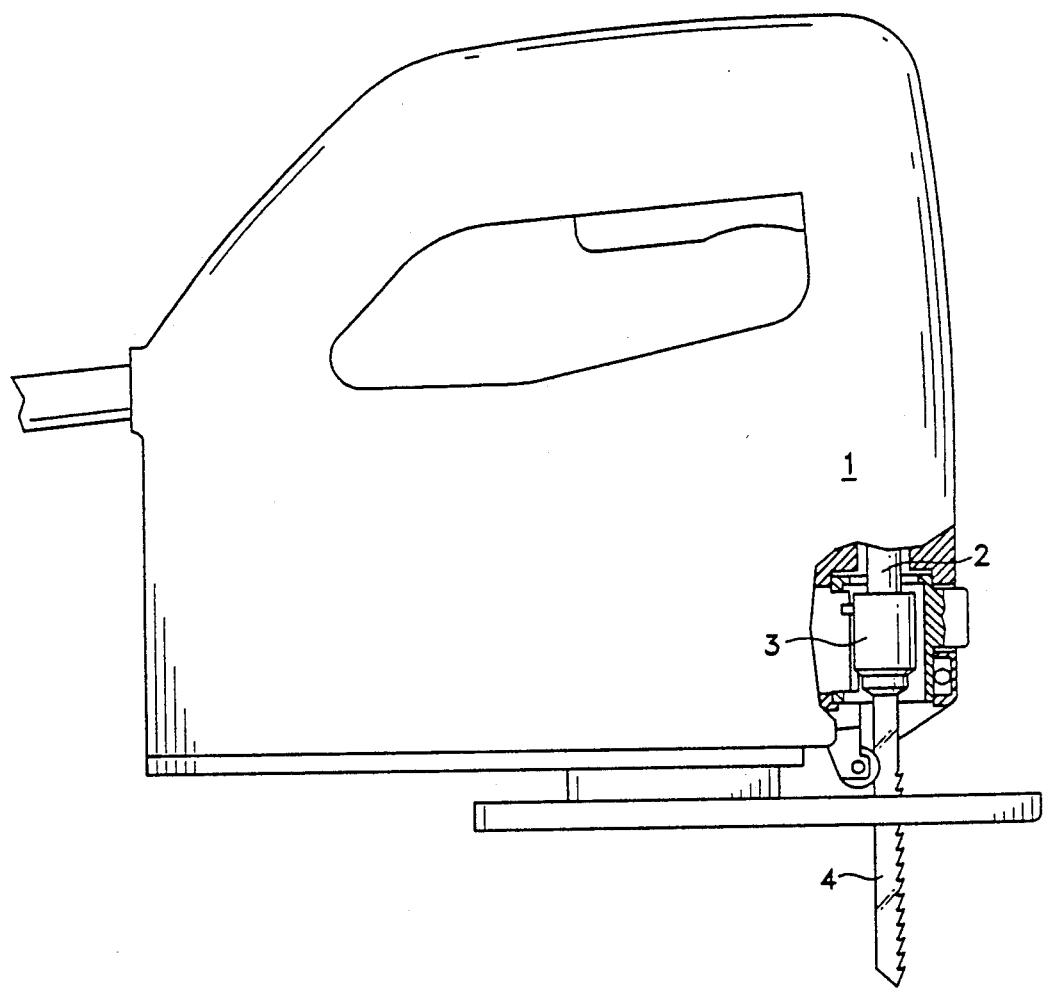
FIG. 1 is a view of a compass sawing machine, cut away in the area of the clamping device.

A hand-actuated compass sawing machine has a housing 1. A motor-driven plunger 2 is mounted in the housing 1. A clamping device 3, which is driven with the plunger 2 according to the saw stroke S, also oscillatingly if desired, is arranged at the plunger 2. A saw blade 4 with a clamped end 5 can be fixed at the clamping device 3. Two dogs 6 are made in one piece with the clamped end 5. The saw blade 4 is represented by dash-dotted lines in FIGS. 2 and 3.

To receive the clamped end 5, a centering sleeve 7 is arranged at the plunger 2, or the centering sleeve 7 is designed formed on plunger 2. The centering sleeve 7 has an external threaded section 8, on which a clamping sleeve 10 is mounted by means of an inner threaded section 9. The threaded sections 8, 9 form an inclined plane, by means of which the clamping sleeve 10 can be moved axially in the direction of the longitudinal aids L in relation to the centering sleeve 7. A torsion spring 11 is arranged between the centering sleeve 7 and the clamping sleeve 10.

The centering sleeve 7 is provided, at its lower end, with wedge-shaped inclined planes 12 for guiding the dogs 6 (cf. FIG. 3). The clamping sleeve 10 has a lower edge 13, which presses the dogs 6 against the inclined planes 12 during the clamping of the saw blade 4.

To securely support the upper end zone 14 of the saw blade 4 as well, a centering pin, which is loaded by means of a compression spring 15, and is formed by two centering jaws 16, 17, with which an insert 18 loaded by the compression spring 15 is in contact, is mounted in the centering sleeve 7. The insert 18 now presses a bevel 19 of each of the centering jaws 16, 17, and the centering jaws 16, 17 are pressed in the outward direction. The centering jaws to 16, 17 have guide surfaces 20, which are in contact with flattened areas 21 of the centering sleeve 7. As a result, the centering jaws 16, 17 are mounted nonrotatably around the longitudinal axis L in the centering sleeve 7. The guide surfaces 20 are guided without clearance in the centering sleeve 7 due to the compression spring 15, 16 acting on the bevels 19 via the insert 18.

To support the end zone 14, further inclined planes 22, which are also able to accommodate saw blades of different thickness between them, are provided at the two centering jaws 16, 17. Wedge-shaped recesses 23 (cf. FIG. 2) of the centering jaws 16, 17 are also used to accommodate the end zone 14 of the clamped end 5.

To secure the two centering jaws 16, 17 axially relative to one another, one of the centering jaws 16, 17 engages a recess 25 of the other centering jaw 17, 16 by means of a hump 24. Shoulders 26 of the centering jaws 16, 17 limit the axial movement thereof. Projections 16', 17' support the guiding of the centering jaws 16, 17 in the centering sleeve 7 and the insertion of the end zone 14 of the saw blade 4 between the centering jaws 16, 17.

A connection bush 27 is rotatably mounted as an adjusting member for the clamping sleeve 10 in the housing 1. Its axis of rotation is slightly eccentric to the longitudinal axis L and parallel thereto (cf. FIG. 4). A gripping member 28, which extends through an opening 29 at the front side of the housing 1, is provided at the connection bush 27.

The connection bush 27 has a recess 30, one side wan of which forms a stop edge 31. The stop edge 31 extends in parallel to the longitudinal axis L over a section that is longer than the saw stroke S. An actuating cam 32 of the clamping sleeve 10 is located opposite the stop edge 31.

A tension spring 33 acts on the connection bush 27. The wall 34 of the connection bush 27 is made oval, so that the clamping sleeve 10 is able to move freely within the connection bush 27, even if it performs an oscillating movement in addition to the saw stroke. This is indicated by dash-dotted lines in FIG. 4. An inner wall area 35 of the wall 34 is closer to the clamping sleeve 10 than the wall 34 in the area of the oscillating stroke.

The mode of operation of the device described is approximately as follows:

FIGS. 2 and 3 show the clamping sleeve 10 in its clamping position. In this position, it is screwed upward on the threaded section 8, 9 by means of the torsion spring 11 such that its the edge 13 presses the dogs 6 of the saw blade 4 in the upward direction against the inclined planes 12. The saw blade 4 is thus clamped securely, regardless of its thickness. The end zone 14 of the saw blade 4 is held radially without clearance by the centering jaws 16, 17, which in turn are guided without clearance in the centering sleeve 7. The end zone 14 of the saw blade 4 is thus unable to deviate during cutting even in the case of transverse load acting on the saw blade 4. This improves the precision of cut. During the sawing operation, the connection bush 27 is in its non-actuated position (cf. FIG. 4). In this position, the clamping sleeve 10 or its actuating cam 32 does not touch the connection bush 27 either during the sawing stroke taking place in the direction of the longitudinal axis L, or during an additional oscillating stroke. The connection bush 27 is held in this position by the tension spring 33, and the gripping member 28 strikes an edge of the opening 29.

Figure 4:
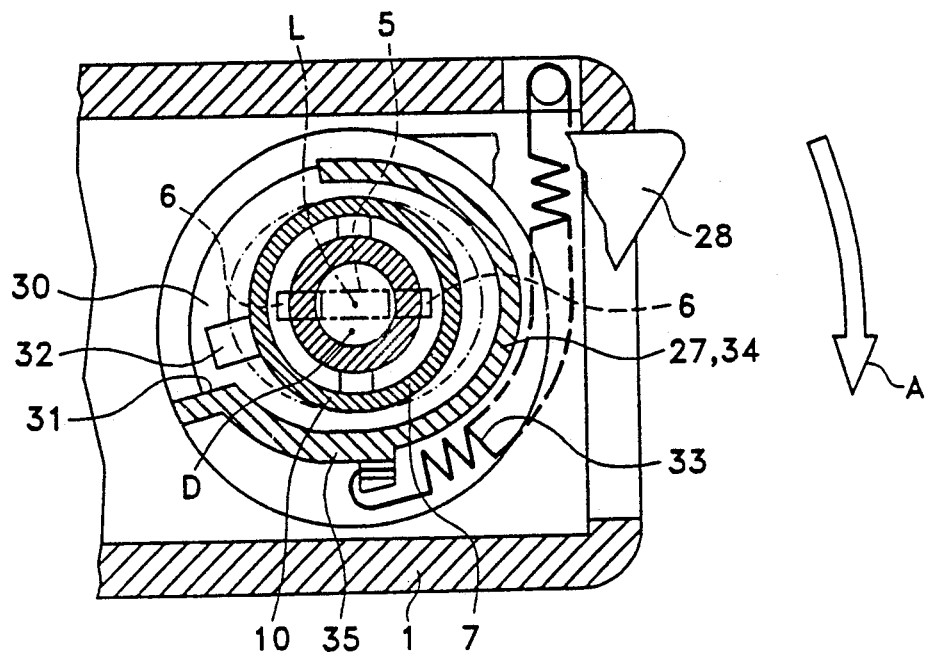
FIG. 4 is a cross sectional view taken along line IV—IV according to FIG. 2 in the non-actuated position of the connection bush.
Figure 5:
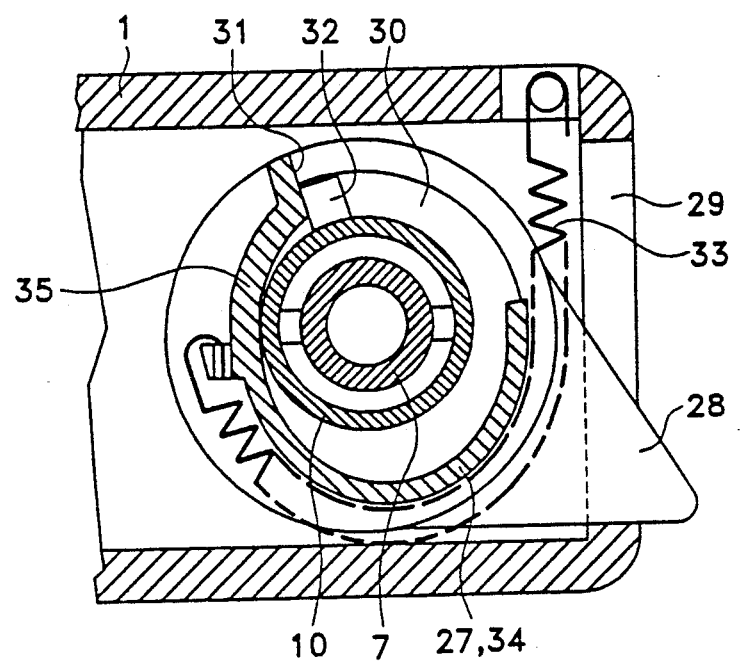
FIG. 5 is a cross sectional view corresponding to FIG. 4 in the actuated position of the connection bush.

When the saw blade 4 is to be replaced, the gripping member 28 is pivoted in the direction of the arrow A (cf. FIG. 4). The connection bush 27 now rotates against the force of the tension spring 33 around the axis of rotation D. During this rotary movement, the stop edge 31 strikes the actuating cam 32, regardless of the position of the sawing stroke S in which the actuating cam 32 is located, and as a result, it rotates the clamping sleeve 10 against the force of the torsion spring 11 into its releasing position, as is shown in FIG. 5. During the rotation of the connection bush 27, its the inner wall part 35 reaches the circumference of the clamping sleeve 10 on the side facing away from the opening 29, so that the clamping sleeve 10 is forcibly moved at the front end point of the deflection of the oscillation, which end point is close to the opening 29.

In the releasing position of the clamping sleeve 10, the edge 13 is removed from the dogs 6 of the saw blade 4, so that the saw blade 4 can be pulled out in a simple manner. If the gripping member 28 is released, it returns, together with the connection bush 27, into the position shown in FIG. 4. Under the action of the torsion spring 11, the clamping sleeve 10 and, together with it, the actuating cam 32, automatically return into the position shown in FIG. 4.

If a the saw blade 4 is again to be inserted, the connection bush 27 is again rotated by means of the gripping member 28, so that the clamping sleeve 10 will again come into its releasing position. The saw blade 4 can then be inserted into the centering sleeve 7. Its end zone 14 now comes to lie between the centering jaws 16, 17, and its the dogs 6 find a stop at the inclined planes 12. The gripping member 28 is then released, so that the stop edge 31 of the connection bush 27 will move away from the actuating cams 32 under the action of the tension spring 33. The connection bush 27 rotates, with its edge 13, to below the dogs 6 under the action of the torsion spring 11, and clamps them the dogs 6 axially against the inclined planes 12. The sawing machine is thus again ready to operate. The thickness of the saw blade 4 determines the rotation angle position of the actuating cam 32 from the stop edge 31 within the recess 30.

It is also possible to design the centering jaws 16, 17 together in one piece. The connection of the centering jaws 16, 17 is now elastic, with an outwardly directed pretension.

The actual saw blade 4 is fixed centrally at its the dogs 6 between the inclined planes 12, regardless of its thickness. The saw blade 4 is additionally held at the upper end zone 14 of the clamped end 5 by the spring-loaded centering jaws 16, 17 or the inclined planes 22 thereof. It is also held without clearance, nonrotatably around the longitudinal axis L.

For fixing the saw blade 4, it is also favorable for the supporting force of the torsion spring 11 to be supported by frictional resistances. Consequently, the torsion spring 11 must apply only a relatively low torque in order to achieve the desired clamping of the saw blade 4.

It is also favorable for the connection bush to be able to be actuated in any stroke position of the saw blade, without a risk of injury to the user, and for it to readily return into a secure starting position. The saw blade 4 may also be released, in principle, as long as the plunger 2 is not moving.

Figures 6, 7:
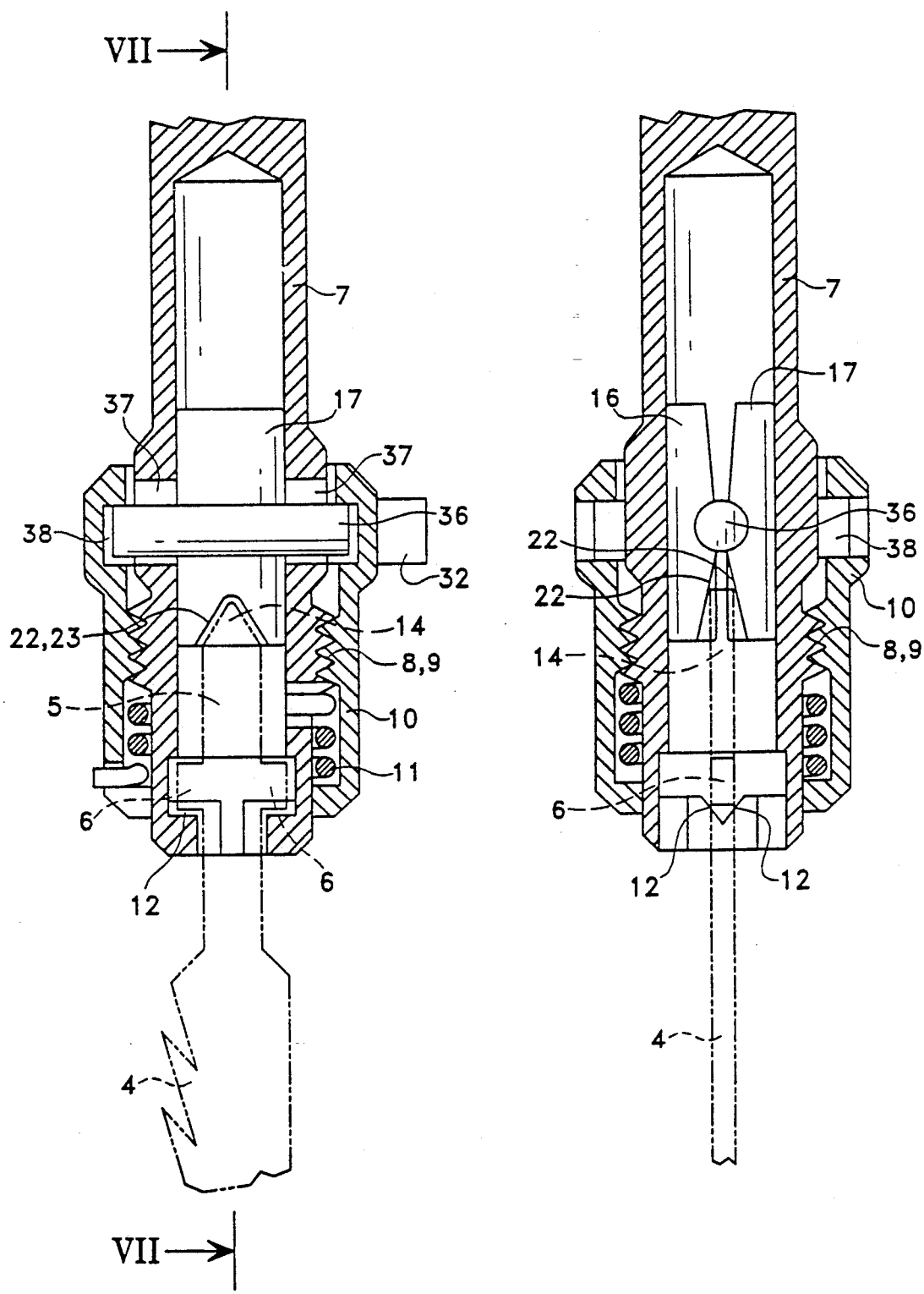
FIG. 6 is a longitudinal sectional view of another exemplary embodiment.
FIG. 7 is a longitudinal sectional view taken along line VII—VII according to FIG. 6.

The connection bush is not shown in the exemplary embodiment according to FIGS. 6 and 7. Similarly to the exemplary embodiment according to FIGS. 1 through 4, the actuating cam 32 of the clamping sleeve 10 engages an opening of the connection bush. Components corresponding to those in FIGS. 1 through 4 are designated by the same reference numerals.

The centering jaws 16, 17 are mounted on a pin 36, and are nonrotatably guided in the centering sleeve 7.

The pin 36 extends on both sides through openings 37 of the centering sleeve 7 and into an annular canal 38 of the clamping sleeve 10. Each centering jaw 16, 17 has an inclined plane 22, which extends in the form of a wedge to accommodate the end zone 14 of the clamped end 5 of the saw blade 4. Thus, the centering jaws 16, 17 are also able to hold between them saw blades of different thickness. The inclined planes 12 extending in the form of a wedge for supporting the dogs 6 of the saw blade 4 are designed below at the centering sleeve 7.

The mode of operation of the exemplary embodiment according to FIGS. 6, 7 is essentially as follows:

During operation, the saw blade 4 is clamped securely in a positive-locking manner, without clearance, nonrotatably around the longitudinal axis L, and centered, regardless of its thickness. In the clamped state, the clamping sleeve 10 is rotated along the threaded sections 8, 9 in relation to the centering sleeve 7 under the action of the torsion spring 11. The upper edge of the annular canal 38 now presses the pin 36 in the downward direction, and the pin 36 presses the centering jaws 16, 17 with their the inclined planes 22 in the longitudinal direction L onto the clamped end 5, which is now located in the wedge-shaped recesses 23 of the centering jaws 16, 17. As a result, the dogs 6 are pressed between the wedge-shaped inclined planes 12 of the centering sleeve 7. As a reaction to the clamping force acting on the clamped end 5, the two centering jaws 16, 17 come to lie on the centering sleeve 7 on the inside without clearance.

When the saw blade 4 is to be replaced, the clamping sleeve 10 is rotated in relation to the centering sleeve 7, as described in the exemplary embodiment according to FIGS. 1 through 4. The centering sleeve 7 will then move upward in the longitudinal direction L along the threaded sections 8, 9 against the action of the torsion spring 11, and carry—with the lower edge of its the annular canal 38—the pin 36, which will now pull off the centering jaws 16, 17 from the end zone 14 of the clamped end 5. The saw blade 4 can now be removed from the inclined planes 12 and—by rotation by about 90°—from the centering sleeve 7. Another saw blade can then be inserted, and, depending on whether it is thicker or thinner, it can be clamped in a positive-locking manner, centered, and without clearance in the manner described under the action of the torsion spring 11.

In the exemplary embodiment according to FIGS. 1 through 7, the gripping member 28 at the housing 1 is relatively close to the saw blade 4 (cf. FIG. 1). In contrast, provisions are made in the exemplary embodiment according to FIGS. 8 and 9 for the connection bush 27 and its gripping member 28 to be arranged at the housing 1 far from the saw blade 4. The centering sleeve 7 extends far in the upward direction in the housing 1. A projection 39 is provided on the outside of the centering sleeve 7 for the drive by the plunger 2.

The clamping sleeve 10 is mounted by means of the threaded sections 8, 9 at the top end. An extension 40 of the clamping sleeve 10 extends in the downward direction in the centering sleeve 7, and has a mounting head 41 for the wedge-shaped end zone 14 of the clamped end 5 of the saw blade 4. A funnel-shaped, conical depression 42, adapted to the wedge shape of the end zone 14, is provided at the mounting head 41.

The mounting head 41 is supported with a sealing ring 43 in the centering sleeve 7. The centering sleeve 7 has the wedge-shaped inclined planes 12 for supporting the dogs 6. The torsion spring 11 engages the mounting head 41, on the one hand, and the entering sleeve 7, on the other hand.

During operation, the depression 42 of the mounting head 41 is pressed onto the clamped end 5 under the action of the torsion spring 11 and of the threaded sections 8, 9. The clamped end 5 is now fixed in a positive-locking manner. As a result, the dogs 6 are also pressed between the inclined planes 12.

To replace the saw blade 4, the connection bush 27 is rotated, and it carries the clamping sleeve 10. As a result, the mounting head 41 moves away from the clamped end 5, so that the saw blade 4 can be replaced as described.

Figure 10:
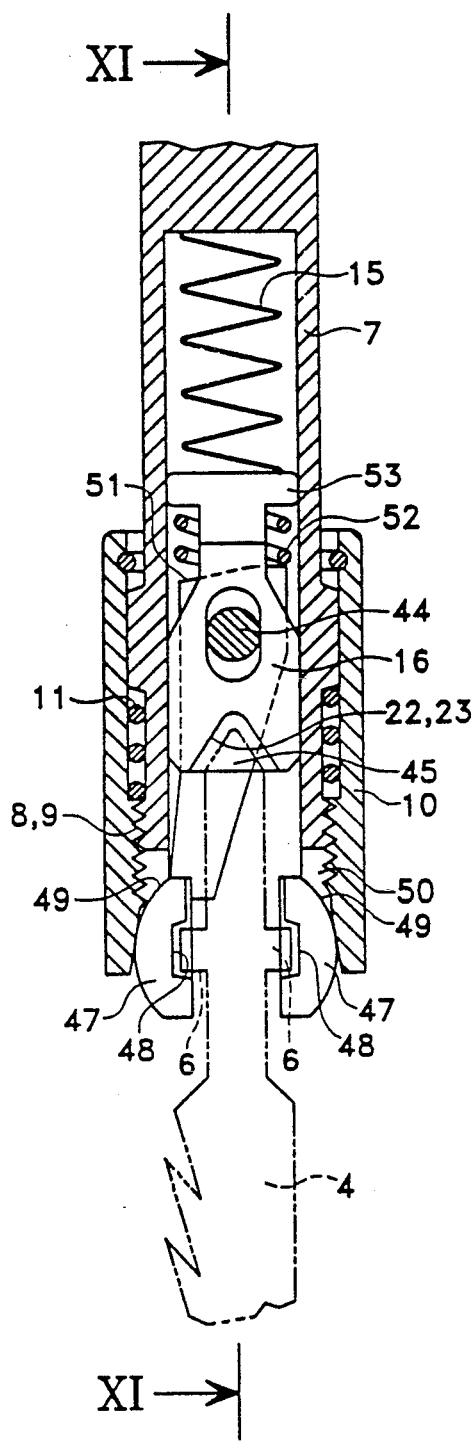
FIG. 10 is a longitudinal sectional view of another exemplary embodiment.
Figure 11:
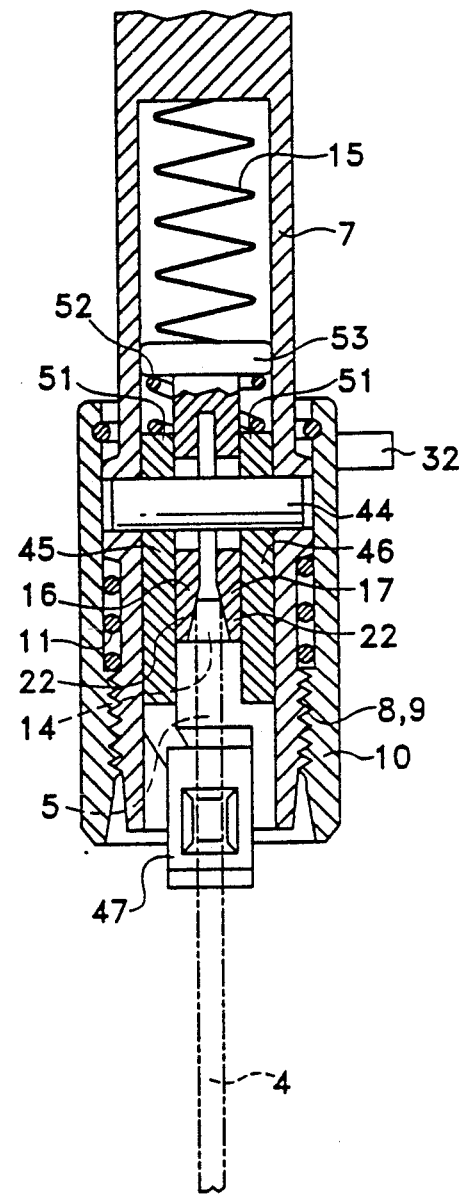
FIG. 11 is a sectional view taken along line XI—XI according to FIG. 10.

The parts corresponding to the above-described parts are again designated by the same reference numerals in the exemplary embodiment according to FIGS. 10 and 11. The compression spring 15 arranged in the centering sleeve 7 presses the centering pin, which forms the two centering jaws 16, 17, which have the inclined planes 22 for clamping the upper end zone 14 of the clamped end 5.

A cross pin 44, on which two arms 45, 46 are mounted, is arranged at the centering pin 7. Each the arm 45, 46 has, at its end facing away from the cross pin 44, a clamping jaw 47 each for each of the dogs 6 of the saw blade 4. The clamping jaws 47 have a mount 48 on the inside for the dogs 6, and are provided with a bulge 49 on the outside. An inner cone 50 of the clamping sleeve 10 is associated with the bulges 49.

Bevels 51, which are pressed by a compression spring 52, which is supported at a shoulder 53 of the centering pin, are provided at the end of the arms 45, 46 facing away from the clamping jaws 47.

The mode of operation of the exemplary embodiment according to FIGS. 10 and 11 is essentially as follows:

In the clamping position (cf. FIGS. 10 and 11), the inner cone 50 presses the mounts 48 of the clamping jaws 47 via the dogs 6, which are held without clearance as a result. As was described, the compression spring 15 presses the inclined planes 22 of the centering jaws 16, 17 against the end zone 14 of the clamped end 5. As a result, the saw blade 4 is clamped without clearance and nonrotatably in the desired manner.

To replace the saw blade 4, the clamping sleeve 10 is moved upward against the force of the spring 11. The inner cone 50 now releases the clamping jaws 47. The arms 45, 46 are now pivoted in the outward direction by the compression spring 52 acting on the bevels 51, so that the clamping jaws 47 will automatically move away from the dogs 6. The saw blade 4 can now be removed or replaced without rotation. For further explanations, see above.

Further exemplary embodiments, which arise from the combination of the partial characteristics described in the exemplary embodiments presented, are also within the scope of the present invention. For example, the spring 11 does not have to be a torsion spring. It may also be a compression spring. The clamping sleeve or the connection bush are to be brought into the clamping position by hand in this case.

While specific embodiments of the invention have been shown and described in detail to illustrate the application of the principles of the invention, it will be understood that the invention may be embodied otherwise without departing from such principles.

What is claimed is:

1. Clamping device for a saw blade of a hand-operated compass sawing machine, the saw blade being movable in parallel to a longitudinal axis of the saw blade by means of a plunger driven according to a sawing stroke in a housing of the compass sawing machine, the saw blade having two dogs at a clamped end, the clamping device comprising:
   a centering sleeve defining an interior region for receiving said clamped end of said saw blade, said centering sleeve having an outer inclined plane surface;
   a clamping sleeve mounted rotatably about said longitudinal axis, said clamping sleeve having an inclined surface engaging said centering sleeve inclined surface;
   spring means between said clamping sleeve and said centering sleeve for axial movement of said clamping sleeve upon relative rotation between said centering sleeve inclined surface and said clamping sleeve inclined surface to generate a clamping force for clamping said dogs of said clamped end of said saw blade in said centering sleeve to achieve a clamping position;
   adjusting means for rotating said clamping sleeve from said clamping position into a releasing position against the force of said spring, said adjusting means including an axially nondisplaceably mounted connection bush, said connection bush has an axis of rotation for pivoting said housing, said connection bush axis of rotation being approximately around said longitudinal axis, a gripping member being connected to said connection bush and extending through an opening in said housing, said connection bush forming a stop edge having a length extending in said axial direction, said length being at least as long as a sawing stroke of said sawing machine, said clamping sleeve having an actuating cam, said stop edge being located opposite said actuating cam for rotating said clamping sleeve upon movement of said gripping member from a clamping position into a releasing position.

2. A clamping device according to claim 1, wherein: said connection bush axis of rotation is parallel to said longitudinal axis.

3. A clamping device according to claim 1, further comprising:
   a return spring acting between said housing and said connection bush whereby said connection bush is returned from said release position into said clamping position.

4. A clamping device according to claim 3, wherein: said return spring brings said connection bush into a resting position wherein a stop edge of said connection bush is located at a spaced location from said actuating cam.

5. A clamping device according to claim 1, wherein: said compass saw is an oscillating compass saw and said connection bush has an inner wall which is closer to said clamping sleeve than a remaining wall part of said connection bush, said inner wall pressing said clamping sleeve when oscillating to an end point of a deflection of oscillation, upon actuation of said connection bush.

6. A clamping device according to claim 5, wherein: said wall of said connection bush has an oval cross section.

7. A clamping device according to claim 5, wherein:

said connection bush has an axis of rotation located parallel to said longitudinal axis between said longitudinal axis and said inner wall area.

8. A clamping device according to claim 1, wherein: said saw blade clamp end has an end zone engaging a centering pin, said centering pin being elastically supported in said centering sleeve, said centering pin being formed of two centering jaws pressed by an additional spring against said centering sleeve without clearance.

9. A clamping device according to claim 8, wherein: said centering jaws are guided nonrotatably around said longitudinal axis in said centering sleeve.

10. A clamping device according to claim 8, wherein: said centering jaws are made in one piece with an elastic connection, said centering jaws being positioned in said centering sleeve pretensioned toward the outside.

11. A clamping device according to claim 1, wherein: said spring means is a torsion spring.

12. A clamping device according to claim 1, wherein: said clamping sleeve carries two centering jaws for receiving an end zone of said clamped end of said saw blade.

13. A clamping device according to claim 1, wherein: said clamping sleeve includes a mounting head with a funnel shaped depression for accommodating a wedge shaped end zone of said clamped end of said saw blade.

14. A clamping device according to claim 1, wherein: arms provided with clamping jaws are pivotably mounted in said centering sleeve, said clamping jaws being pressed against said dogs by means of said clamping sleeve.

* * * * *